(No Model.)
J. A. VAN KIRK.
BRACKET.
No. 327,839. Patented Oct. 6, 1885.
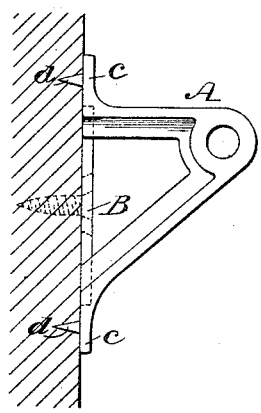
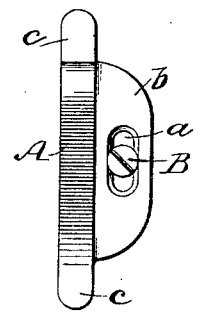
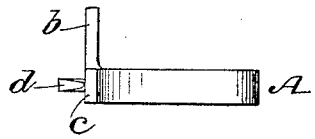
WITNESSES:
INVENTOR:
J. A. Van Kirk
BY Munn & Co
ATTORNEYS.

United States Patent Office.

JAMES A. VAN KIRK, OF NEW BRUNSWICK, NEW JERSEY.

BRACKET.

SPECIFICATION forming part of Letters Patent No. 327,839, dated October 6, 1885.

Application filed August 27, 1884. Serial No. 141,553. (No model.)

*To all whom it may concern:*

Be it known that I, JAMES A. VAN KIRK, of New Brunswick, in the county of Middlesex and State of New Jersey, have invented a new and Improved Bracket, of which the following is a full, clear, and exact description.

My invention relates to improvements in metallic brackets designed more especially for holding window-shade rollers; and the invention consists in providing the bracket with spurs to facilitate securing it in place, and with a slot or elongated passage through which the screw for holding it in place passes, so that by loosening the screw the bracket can be adjusted without entirely removing the screw.

Reference is to be had to the accompanying drawings, forming part of this specification, in which similar letters of reference indicate corresponding parts in all the figures.

Figure 1 is a side elevation of my new and improved bracket as it appears when secured in position for use. Fig. 2 is a front elevation of the bracket, and Fig. 3 is a plan view of the bracket.

The arm A of the bracket may be of ordinary form. The bracket is secured in position for use by the screw B, which passes through the slot $a$, made in the side flange or plate, $b$. The flange or plate $b$ is by preference made to extend nearly the whole width of the bracket, so that only one screw need be used to hold the bracket; but instead of this the extensions $c$ $c$ may be enlarged and apertured to receive screws for holding the bracket. The extensions $c$ have the spurs $d$ formed upon their under surfaces to enter the wall or object to which the bracket is to be secured, so that these spurs will hold the bracket in position while the screw is being inserted.

By forming the bracket with a slot or elongated passage for the screw the bracket may be adjusted up or down without entirely removing the screw and without making a new insertion of the screw, which is of great advantage where the bracket is required to be set at a certain position.

Having thus fully described my invention, I claim as new and desire to secure by Letters Patent—

As an improved article of manufacture, the bracket A, provided with the slot $a$ and the spurs $d$, as set forth.

JAMES A. VAN KIRK.

Witnesses:
CHAS. F. DAVIES,
E. S. CAMPBELL.